US009975446B2

(12) United States Patent
Weber et al.

(10) Patent No.: US 9,975,446 B2
(45) Date of Patent: May 22, 2018

(54) VEHICLE CHARGE SYSTEM

(71) Applicant: FORD GLOBAL TECHNOLOGIES, LLC, Dearborn, MI (US)

(72) Inventors: David Charles Weber, Toledo, OH (US); Imtiaz Ali, Lathrup Village, MI (US); Mohannad Hakeem, Dearborn, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/053,447

(22) Filed: Feb. 25, 2016

(65) Prior Publication Data

US 2017/0246962 A1    Aug. 31, 2017

(51) Int. Cl.
*B60L 11/18* (2006.01)

(52) U.S. Cl.
CPC ......... *B60L 11/1846* (2013.01); *B60L 11/182* (2013.01); *B60L 11/1811* (2013.01); *B60L 11/1816* (2013.01); *B60L 11/1848* (2013.01); *B60L 11/1862* (2013.01)

(58) Field of Classification Search
CPC .............. B60L 11/1846; B60L 11/1862; B60L 11/1848; B60L 11/1811; B60L 11/182; B60L 11/1816
USPC ........................................................ 320/107
See application file for complete search history.

(56) References Cited

U.S. PATENT DOCUMENTS

| 8,798,832 | B2* | 8/2014 | Kawahara et al. . H01M 10/441 701/22 |
| 9,352,635 | B1* | 5/2016 | Schepmann et al. ................ B60H 1/00392 |
| 9,371,008 | B2* | 6/2016 | Bouman ................. B60L 1/003 |
| 9,637,014 | B2* | 5/2017 | Schneider et al. .... B60L 11/182 |
| 9,748,777 | B2* | 8/2017 | Owen et al. .......... H02J 7/0021 |
| 2011/0131083 | A1 | 6/2011 | Redmann et al. |

(Continued)

OTHER PUBLICATIONS

Anonymous, "Method for prioritizing charging based on type of e.g.. battery electric vehicle, in charge station, involves repeating battery electric-plug-in hybrid electric vehicle cycling based on higher SOC thresholds", RD 594026 A, Oct. 2013, 2 pages.*

*Primary Examiner* — Sun Lin
(74) *Attorney, Agent, or Firm* — David B. Kelley; Brooks Kushman P.C.

(57) ABSTRACT

A vehicle charge station includes at least a first interface and second interface coupled with a power converter and a controller. The controller is configured to, in response to detecting a battery electric vehicle (BEV) classified vehicle coupled with the power converter via the first interface while flowing a charge current to a plug-in hybrid electric vehicle (PHEV) classified vehicle via the second interface, redirect the charge current from the second interface to the first interface. Also, a method of controlling a charge station includes receiving first vehicle data from a first vehicle connected to a first interface and transferring power to the first interface. The method then receives second vehicle data from a second vehicle connected to a second interface and, in response to a comparison of the first vehicle data and the second vehicle data indicating a higher priority for the second vehicle, redirects power from the first interface to the second interface.

11 Claims, 3 Drawing Sheets

(56) References Cited

U.S. PATENT DOCUMENTS

| | | | |
|---|---|---|---|
| 2012/0056588 A1* | 3/2012 | Cai et al. | B60L 11/1824 320/128 |
| 2013/0049677 A1* | 2/2013 | Bouman | B60L 1/003 320/106 |
| 2013/0179061 A1 | 7/2013 | Gadh et al. | |
| 2013/0204471 A1 | 8/2013 | O'Connell et al. | |
| 2014/0021914 A1* | 1/2014 | Martin et al. | H02H 5/045 320/109 |
| 2014/0042973 A1* | 2/2014 | Kawahara et al. | H01M 10/441 320/118 |
| 2014/0117946 A1* | 5/2014 | Muller et al. | B60L 11/18 320/162 |
| 2015/0042168 A1 | 2/2015 | Widmer | |
| 2015/0280466 A1* | 10/2015 | Owen et al. | H02J 7/0021 320/107 |

\* cited by examiner

VEHICLE CHARGE SYSTEM

TECHNICAL FIELD

This application is generally related to interfacing a vehicle charging system to multiple vehicles.

BACKGROUND

Electrified vehicles including hybrid-electric vehicles (HEVs) and battery electric vehicles (BEVs) rely on a traction battery to provide power to a traction motor for propulsion and a power inverter therebetween to convert battery DC power to AC power used by the traction motor. To aid in charging of certain traction batteries, an external charger or charge station may supply charge current.

SUMMARY

A vehicle charge station includes at least a first and second interface coupled with a power converter and a controller. The controller is configured to, in response to detecting a BEV classified vehicle coupled with the power converter via the first interface while flowing a charge current to a PHEV classified vehicle via the second interface, redirect the charge current from the second interface to the first interface.

A vehicle charge station includes first and second interfaces coupled with a power converter and a controller. The controller is configured to, in response to receiving a first SOC, of a first vehicle coupled with the power converter via the first interface, that is less than a second SOC, of a second vehicle receiving a charge current via the second interface, redirect the charge current from the second interface to the first interface.

A method of controlling a charge station includes receiving first vehicle data from a first vehicle connected to a first interface and transferring power to the first interface. The method then receives second vehicle data from a second vehicle connected to a second interface, and in response to a comparison of the first vehicle data and second vehicle data indicating higher priority for the second vehicle, redirecting power from the first interface to the second interface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Currently, charge stations for HEVs and BEVs are configured to provide a charging interface from a charge station to an electric vehicle. Often, the interface is limited to a specific type of interface. For example, two common charging interfaces include a cable with a plug (e.g. connector) and an inductive pad. The connector may include contacts to create or close an electrical connection between an electric vehicle charge station and an electric vehicle. Also, as there are multiple variants of the two common charging interfaces, typically electric vehicle charge stations are configured with only one of the many interface types.

According to the society of automotive engineers (SAE), the many interface types are categorized to include an AC level 1, AC level 2, DC level 1, DC level 2, and DC level 3 charging. A 120 volt AC (16 A peak) charging interface referred to as AC Level 1 charging. A 240 volt AC (80 A peak as of 2009) charging interface is referred to as AC Level 2 charging. A 200-450 V DC (80 A) charging interface is referred to as DC Level 1 charging. A 200-450 V DC (200 A) charging interface is referred to as DC Level 2 charging. And a 200-600 V DC (maximum of 400 A) charging interface is referred to as DC Level 3 charging. Likewise, there are multiple plug options to charge a variety of electric vehicles. For example, considering a first family or type of plugs (Type 1) includes the AVCon plug that was used around 2001, which then changed to SAE J1772-2001 and then to SAE J1772-2009. Similarly there are three other plug types; Type 2 is a single or three-phase vehicle interface utilizing a plug specification such as VDE-AR-E 2623-2-2. Type 3 is a single or three-phase vehicle interface with safety shutters utilizing a specification such as provided by the EV Plug Alliance. And, Type 4 is a fast charge coupler adapted for special systems including the specification as described by CHAdeMO Association.

Here, a charge station is configured with a plurality of charge interfaces (e.g., connectors or inductive pads) wherein each charge interface is configured to meet the specification of the standard of the interface type. For example, the International Electrotechnical Commission defines 4 modes of electric vehicle charging (IEC 62196): Mode 1 is slow charging using an electrical cable plug (single or three-phase). Mode 2 is slow charging from an electric cable equipped with an EV protection arrangement (e.g., Park & Charge or PARVE systems). Mode 3 may be slow or fast charging using an EV multi-pin socket with control and protection functions (e.g., SAE J1772 and IEC 62196). And, Mode 4 is fast charging using charger technology such as specified by the CHAdeMO Association.

Due to the limited number of charging stations, owners of BEVs and PHEVs are required to move their vehicles during the day. Furthermore as charge time decrease, currently fast charging the time is 1 e Therefore the use of Prioritize BEVs over PHEV.

Figure 1:
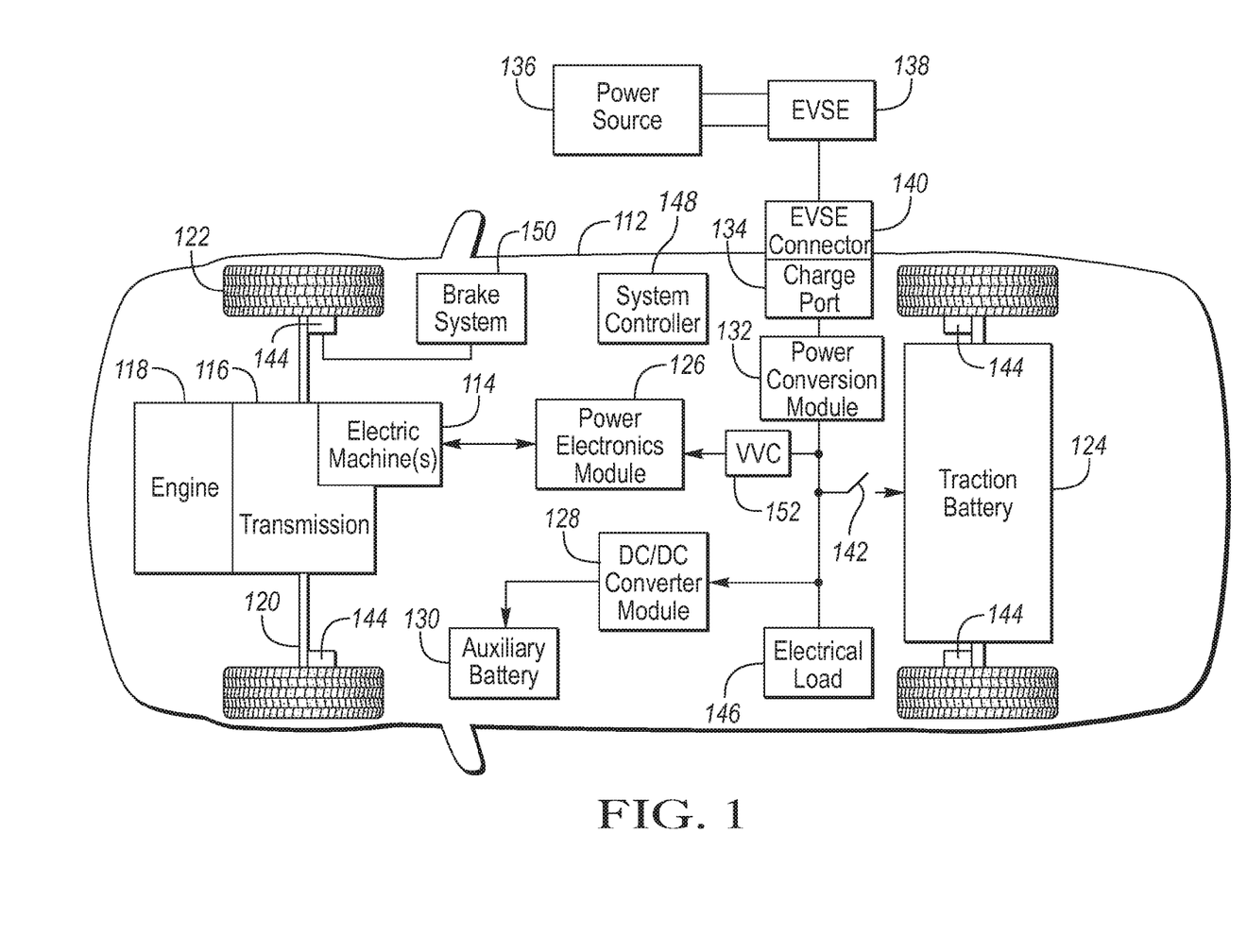
FIG. 1 is a diagram of a hybrid vehicle illustrating typical drivetrain energy storage components and vehicle charge station connections.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV).

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
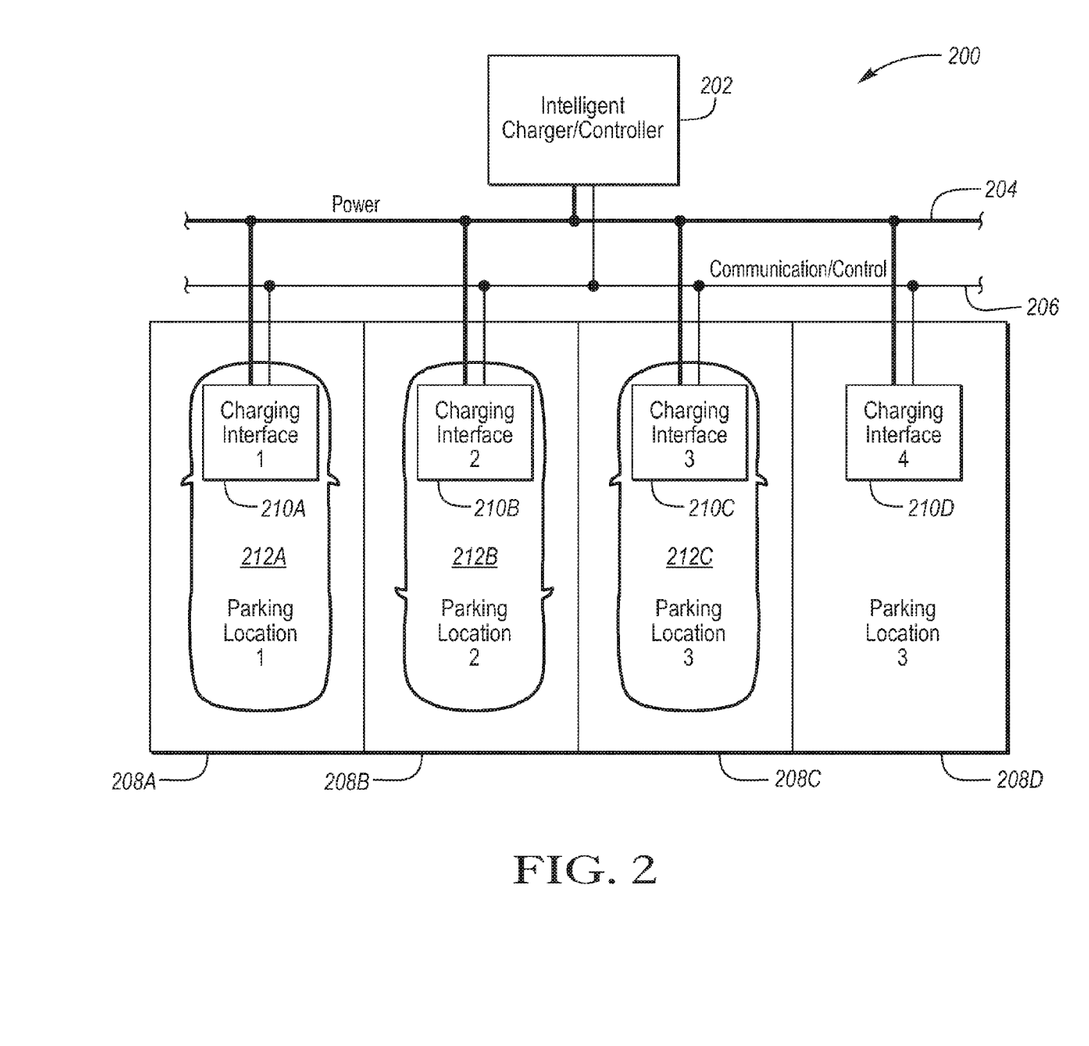
FIG. 2 is a diagram of a charge system including a charge station configured to electrically couple with a plurality of electric vehicles.

FIG. 2 is a diagram of a charge system 200 including a charge station 202 configured to electrically couple with a plurality of electric vehicles 212. The charge station 202 includes a computer, processor, controller, programmable electronic control unit or dedicated electronic control unit and power electronics. The power electronics includes IGBTs, MOSFETs, transformers, voltage converters, rectifiers, diodes, capacitors, inductors, and other electrical or electronic components. The charge station 202 may receive power directly from a power grid or may come from a secondary source such as a residence, apartment complex, or working complex. A change station connected directly to a power grid may have an input voltage of 480V, 1,200V, or 4,000V and that voltage may be converted by the charge station to the voltage applied to the charge interface. Also, the charge station may be supplied power from a primary or secondary power grid customer, such as a corporation, apartment complex, or a residential location. A corporation, apartment complex, a business providing charging services for BEV and PHEV, or a residential location may receive power from the power grid and convert the power to a voltage usable at the location such as receiving 480 Volts or 1,200V and converting/relaying the input voltage to 480V, 240V, or 120V to provide local power.

The power from the charge station 202 is carried by power cables 204 to each parking spot 208 specifically to a charge interface 210 associated with specific parking spots 208. Along with the power cables 204, the charge system 200 may include communication cables 206 configured to carry signals between the charge station 202 and the charging interface 210. The charge system 200 may include a variety of configurations for each charge interface 210. For example, a first charging interface 210A associated with a first parking spot 208A may include a SAE J1772-2009 EV plug to electrically couple a first electric vehicle 212A with a charge station 202. A second charging interface 210B associated with a second parking spot 208B may include an inductive charge plate configured to electrically couple a second electric vehicle 212B with the charge station 202. A third charging interface 210C associated with a second parking spot 208C may include an IEC 62196 type 2 plug as specified in the VDE-AR-E 2623-2-2 standard to electrically couple a third electric vehicle 212C with the charge station 202. And a fourth charging interface 210D associated with a fourth parking spot 208D may be configured with a different connection configuration.

In another embodiment of this example, the first charge interface 210A may be configured to provide AC current to the first electric vehicle 212A, the second charge interface 210B may be configured to generate an electric field to pass power to the second electric vehicle 212B, and the third charge interface 210C may be configured to provide a DC current to the third electric vehicle 212C. The currents may be continuous or may be pulse width modulated. Also, the power flowing to the charging interfaces 210 may be switched between the pluralities of charging interfaces according to different time shifting arbitration schemes. Time shifting arbitration is the allocation of time slots based on a need or preference. The need may include a current battery state of charge (SOC), an estimated departure time, or an estimated travel time. The preference may include a consumer energy rate price, a desired battery SOC level, or a desired vehicle temperature. An example of an estimated departure time is a difference in time between the current time to a time at which a vehicle is expected to travel away from the charging station. An example of an estimated travel distance is a distance a vehicle is expected to travel when the vehicle decouples and travels away from the charging station. With the deregulation of energy, consumers are able to contact different energy suppliers to determine who supplies the energy they purchase. An example of the consumer energy rate price is a negotiated price a consumer is charged for energy and for the power distribution infrastructure.

The charge station 202 is shown configured with a plurality of charge interfaces 210 associated with multiple parking spots 208. The charge interfaces 210 may be configured to meet a variety of interface specifications such that a variety of electric vehicles 212 have the ability to park and charge. As the electrical and electronic components used in a charge station 202 may be expensive, it may be cost prohibitive to place a charge station at each parking location 208, and it may be a more cost effective solution to share a charge station 202 with a plurality of charge interfaces 210. FIG. 2 illustrates 4 parking locations 208, however, a charge system 200 may be configured with any number of charge interfaces 210. For example, a charge station may have 8, 12, 16, 24, 32 or other number of charge stations. The charge station system may include a charge station having a power converter to convert the supplied power to the charge station to an output power. The power converter may be configured to provide enough power for a single vehicle, or multiple vehicles, in which the multiple vehicles are less than the charge interfaces in the charge system. To effectively manage the application of power or current to the charge interfaces, a controller in the charge station 202 may employ a time shifting arbitration.

The time shifting arbitration may include time division multiplexing (TDM) or other multiplexing strategies. TDM is dividing a unit of time (e.g., a minute, 5 minutes, an hour, 8 hours, 24 hours) into smaller timeslots. For example, an electric vehicle charge station that has 8 parking spaces with 8 charging interfaces controlled by a controller may use 24 hours as a unit of time, the controller may divided the 24 hours into one hour blocks producing 24 timeslots. Alternatively, the 24 hour unit of time may be divided into 144-10 minute timeslots. When the electric charge station first powers up, all timeslots are available timeslots. The controller may then assign a designation of a reserved timeslot to the timeslots reserved to charge a vehicle. The reservation may be in response to a remote timeslot request via a mobile device, a local request entered on a keypad of the charge station, or via communication with an electric vehicle coupled with the charge station.

An example of timeslot allocation is, for example, an hour unit of time divided into 6 10 minute timeslots that may be divided such that the first timeslot is reserved for a vehicle with a low SOC battery using a first charging interface (i.e. J1772-2009) in a first parking space. The second timeslot is reserved for an electric vehicle using a second charging interface (i.e. J1772-2001) in a second parking space expected to leave in 30 minutes. The third time slot is reserved for the vehicle with the low SOC battery using the first charging interface in the first parking space. The fourth timeslot is reserved for a first consumer paying a premium in an energy rate price using a third charging interface (i.e. IEC62196 type 2) in a third parking space. The fifth timeslot is reserved for a second consumer paying a premium in an energy rate price using a fourth charging interface (i.e. inductive charging plate) in a fourth parking space. And the sixth timeslot maybe reserved via a mobile application received from a mobile phone for a fifth charging interface associated with a reserved parking.

Figure 3:
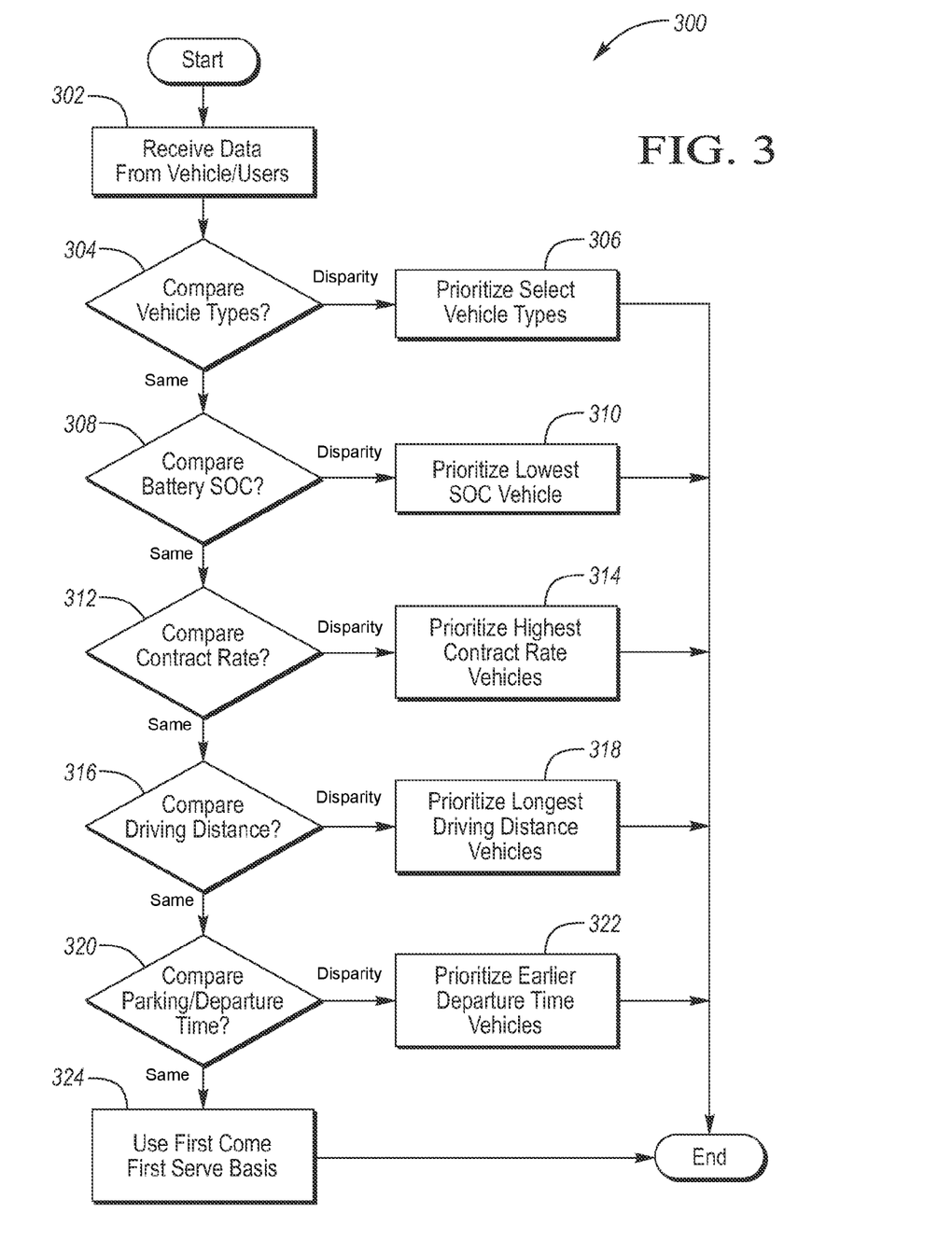
FIG. 3 is a flow diagram illustrating a prioritization scheme to select a target vehicle to charge by a charge station coupled with multiple vehicles.

FIG. 3 is a flow diagram illustrating a prioritization scheme to select a target vehicle to charge by a charge station coupled with multiple vehicles.

In operation 302, a controller receives data from vehicles or users. Here, the data may be received from the charging interface such as the same cable used to carry the charge current (e.g., multiple wires bound to form a rope of wires, wherein some wires carry the charge current and other wires carry data). The data may be automatically sent by a vehicle when the vehicle is coupled with the charge station. The data sent automatically may include a VIN or a battery SOC. Based on the VIN number; the charge station may categorize the vehicle associated with the VIN. For example, a VIN number provides information regarding the manufacturer of the vehicle, and the type of vehicle. (e.g., if the vehicle is a Battery Electric Vehicle (BEV), or a Plug-In Hybrid Electric Vehicle (PHEV)) The controller may prioritize charging of a BEV over charging of a PHEV as a BEV is dependent upon electric energy for propulsion, while a PHEV can revert to operation via fossil fuel to provide propulsion. Alternatively to providing the data automatically, the data may be sent upon being entered into a Graphical User Interface (GUI) screen of the charge station, the GUI of a phone application, an in-vehicle navigation system, or the data may be sent by a $3^{rd}$ party such as a public utility company, a navigation service, a vehicle manufacturer service, or other service provider. The utility company may contract an electric energy rate price, an electric energy distribution price, and a max charge service price; collectively they may be referred to as a contract price or contract rate. The navigation service may be a mapping service used to provide directions; the mapping service may monitor your travel behavior and estimate your future travel time and estimated departure time. Likewise, the GUI of the charge station may prompt a customer to input a future travel time, estimated departure time, and other data to prioritize vehicle charging.

In operation 304, the controller compares the vehicle types based on the input data. If disparity exists between multiple vehicles, the controller will determine a higher priority vehicle and proceed to operation 306. In operation 306, the controller will select a specific vehicle and flow a current to charge the battery of that vehicle. For example, the input data may include Hybrid Electric Vehicle (HEV) type, such as BEV, PHEV, or other HEV. Based on these types, a BEV may be assigned a priority over PHEV. Other vehicle type data may include commercial vehicle, emergency vehicle, or consumer vehicle. Here, the emergency vehicle may be assigned priority over other vehicles. If all vehicles coupled with the charge station have the same vehicle type, the controller will proceed to operation 308.

In operation 308, the controller compares the vehicle battery state of charge (SOC) based on the input data. If disparity exists between multiple vehicles, the controller will determine a higher priority vehicle and proceed to operation 310. In operation 310, the controller will select a specific vehicle based on the SOC and flow a current to charge the battery of that vehicle. For example, the controller may prioritize a vehicle with the lowest battery SOC and charge that battery first. If all vehicles coupled with the charge station have the same SOC, the controller will proceed to operation 312.

In operation 312, the controller compares a contract rate to charge the vehicles based on the input data. If disparity exists between multiple vehicles, the controller will determine a higher priority vehicle and proceed to operation 314. In operation 314, the controller will select a specific vehicle based on the contract rate to charge and flow a current to charge the battery of that vehicle. For example, the controller may prioritize a vehicle with the highest contract rate and charge that battery first. If all vehicles coupled with the charge station have the same contract rate, the controller will proceed to operation 316.

In operation 316, the controller compares an expected future driving distance for the vehicle based on the input data. If disparity exists between multiple vehicles, the controller will determine a higher priority vehicle and proceed to operation 318. In operation 318, the controller will select a specific vehicle based on the expected future driving distance and flow a current to charge the battery of that vehicle. For example, the controller may prioritize a vehicle with the farthest future distance to drive and charge that battery first. If all vehicles coupled with the charge station have the same expected future driving distance, the controller will proceed to operation 320.

In operation 320, the controller compares an expected future departure time for the vehicle based on the input data. If disparity exists between multiple vehicles, the controller will determine a higher priority vehicle and proceed to operation 322. In operation 322, the controller will select a specific vehicle based on the expected future departure time and flow a current to charge the battery of that vehicle. For example, the controller may prioritize a vehicle that is scheduled to leave first and charge that battery first. If all vehicles coupled with the charge station have the same expected future departure time, the controller will proceed to operation 324. In operation 324, the controller selects a specific vehicle based on a first in first out (FIFO) strategy.

FIG. 3 illustrates a flow in which each comparison of vehicle data produces a final selection; however, in another embodiment, each comparison of vehicle data may provide a weight factor added to each vehicle coupled with the charge stations. Here, each of the list criteria is considered and provides weight to make the final determination. For example, considering the first two comparisons (vehicle types and battery SOC); for a vehicle type, a BEV is given 50 points, and a PHEV is given 0 points, SOC may have weight such as 10% equals 90 point, 50% equals 50 points, and 90% equals 10 points. Therefore, a BEV with an SOC at 90% having 60 points (50+10=60) is given priority over PHEV with an SOC of 50% (0+50=50).

In yet another similar embodiment, along with each weight factor, may be a priority factor such that a specific classification of vehicles is given priority level along with the weight factor. For example, BEVs may be given a high priority level, extended range PHEVs may be given a medium priority level, and a mild PHEV may be given a low priority level. Therefore, if multiple BEVs and one mild PHEV were coupled with the charge station at the same time, the BEVs may be given a timeslot over the mild PHEV. Further, the timeslot may be further divided so that the time slot can be time-division multiplexed. Time-division multiplexing is when a time slot is divided into sub-slots so that each vehicle having a certain characteristic (such as BEVs) is sequentially provided with a single sub-slot of multiple sub-slots. For example, a charger coupled with 4 HEVs (BEV1, BEV2, BEV3, and mild PHEV1) where BEV1 has an SOC of 10%, BEV2 has an SOC of 50%, BEV3 has an SOC of 90%, and mild PHEV1 has an SOC of 10%, the charger may divide a one hour time slot into 6-10 minute sub-slots, and assign a $1^{st}$ sub-slot to BEV1, a $2^{nd}$ sub-slot to BEV2, a $3^{rd}$ sub-slot to BEV1, a $4^{th}$ sub-slot to BEV3, $5^{th}$ sub-slot to BEV1, and a $6^{th}$ sub-slot to BEV2. Here, the BEV is prioritized based on classification and the time slots also called sub-slots or sub-timeslots are allocated based on SOC level. Although the timeslots are shown to be based on SOC level, other implementations may be based the timeslots on other vehicle data mentioned above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charge station comprising:
   interfaces coupled with a power converter; and
   a controller configured to log a vehicle identification number (VIN) and a charge duration for each vehicle coupled with the vehicle charge station and to redirect power to a selected one of the interfaces based on an average charge duration associated with the VIN.

2. The vehicle charge station of claim 1, wherein the controller is further configured to, responsive to receiving a first contract price which is greater than a second contract price and is associated with charging a first vehicle coupled with the power converter while flowing a charge current to a second vehicle at the second contract price, redirect the charge current from the second vehicle to the first vehicle.

3. The vehicle charge station of claim 1, wherein the controller is further configured to, responsive to receiving a first entered departure time of a first vehicle coupled with the power converter while flowing a charge current to a second vehicle having a second entered departure time later than the first entered departure time, redirect the charge current from the second vehicle to the first vehicle.

4. The vehicle charge station of claim 1, wherein the controller is further configured to, responsive to receiving a first entered travel time of a first vehicle coupled with the power converter while flowing a charge current to a second vehicle having a second entered travel time less than the first entered travel time, redirect the charge current from the second vehicle to the first vehicle.

5. The vehicle charge station of claim 1, wherein the controller is further configured to reserve a timeslot, based on vehicle data and entered data, and flow a charge current to an interface associated with the timeslot when a present time is within the timeslot.

6. The vehicle charge station of claim 1, wherein the controller is further configured to, responsive to receiving a first state of charge (SOC) of a first vehicle coupled with the power converter that is less that a second SOC of a second vehicle coupled with the power converter, redirect charge current from the second vehicle to the first vehicle.

7. A method of controlling a charge station comprising:
   receiving first vehicle data from a first vehicle connected to a first interface;
   transferring power to the first interface;
   receiving second vehicle data from a second vehicle connected to a second interface; and
   responsive to a result of a comparison of the first vehicle data and the second vehicle data indicating a higher priority for the second vehicle, redirecting power from the first interface to the second interface, wherein the result of the comparison of the first vehicle data and the second vehicle data indicating the higher priority includes a lower battery state of charge, a higher contract price associated with charge energy, a longer expected travel time, or a shorter expected parking time.

8. The method claim 7 further comprising reserving a timeslot based on the result of the comparison and flowing a charge current to an interface associated with the timeslot when a present time is within the timeslot.

9. The method of claim 8, wherein the reserving the timeslot further includes time division multiplexing the timeslot into a plurality of sub-timeslots and allocating each sub-timeslot of the plurality of sub-timeslots to a selected interface of a plurality of interfaces coupled with the charge station such that each vehicle of multiple vehicles sequentially receive a charge current.

10. The method of claim 7 further including logging a vehicle identification number (VIN) and a charge duration for each coupled electric vehicle, wherein the result of the comparison of the first vehicle data and the second vehicle data indicating the higher priority is based on an average charge duration associated with the VIN.

11. A method of controlling a charge station comprising:
    receiving first vehicle data from a first vehicle connected to a first interface;
    transferring power to the first interface;
    receiving second vehicle data from a second vehicle connected to a second interface;
    responsive to a comparison of the first vehicle data and the second vehicle data indicating a higher priority for the second vehicle, redirecting power from the first interface to the second interface; and
    reserving a timeslot based on a result of the comparison and flowing a charge current to an interface associated with the timeslot when a present time is within the timeslot, wherein the reserving the timeslot further includes time division multiplexing the timeslot into a plurality of sub-timeslots and allocating each sub-timeslot of the plurality of sub-timeslots to a selected interface of a plurality of interfaces coupled with the charge station such that each vehicle of multiple vehicles sequentially receive a charge current.

\* \* \* \* \*